United States Patent
Kami et al.

[11] Patent Number: 6,021,671
[45] Date of Patent: Feb. 8, 2000

[54] ACCELERATION SENSOR INCLUDING AN ACCELERATION DETECTION ELEMENT BONDED TO A CIRCUIT SUBSTRATE WITH A CONDUCTIVE BONDING MATERIAL

[75] Inventors: Keiichi Kami, Himi; Jun Tabota, Toyama-ken, both of Japan

[73] Assignee: Murata Manufacturing Co., Ltd., Japan

[21] Appl. No.: 09/129,494

[22] Filed: Aug. 5, 1998

[30] Foreign Application Priority Data

Aug. 6, 1997 [JP] Japan .................................. 9-212163

[51] Int. Cl.[7] .................................................... G01P 15/09
[52] U.S. Cl. ................................... 73/514.34; 310/329
[58] Field of Search ........................... 73/514.34, 514.16, 73/431, 654, 493, 497; 310/315, 319, 329, 311, 333

[56] References Cited

U.S. PATENT DOCUMENTS

| | | |
|---|---|---|
| 3,104,334 | 9/1963 | Bradley et al. . |
| 5,088,326 | 2/1992 | Wada et al. ............................ 73/514.34 |
| 5,128,581 | 7/1992 | Nakayama et al. .................... 73/514.34 |
| 5,481,915 | 1/1996 | Tabota et al. ......................... 73/514.34 |
| 5,606,214 | 2/1997 | Corsaro ................................. 73/514.34 |
| 5,824,904 | 10/1998 | Kouhci et al. ........................ 73/514.34 |

FOREIGN PATENT DOCUMENTS

| | | |
|---|---|---|
| 401669 | 12/1990 | European Pat. Off. ............. 73/514.34 |
| 0550037 | 12/1992 | European Pat. Off. . |
| 1200585 | 9/1965 | Germany . |
| 4341662 | 6/1994 | Germany . |
| 5322915 | 12/1993 | Japan . |
| 6-148228 | 5/1994 | Japan ..................................... 73/514.34 |

*Primary Examiner*—Hezron Williams
*Assistant Examiner*—Helen C. Kwok
*Attorney, Agent, or Firm*—Ostrolenk, Faber, Gerb & Soffen, LLP

[57] ABSTRACT

An acceleration sensor includes a circuit substrate and an acceleration detection element. The acceleration detection element is mounted on the circuit substrate and formed by using a piezoelectric body and is constructed so as to detect an acceleration which acts in a shearing direction. An electrode formed on the circuit substrate and an electrode on the bottom surface of the acceleration detection element are bonded together via a conductive bonding material so that they do not have direct contact with each other.

11 Claims, 9 Drawing Sheets

ACCELERATION SENSOR INCLUDING AN ACCELERATION DETECTION ELEMENT BONDED TO A CIRCUIT SUBSTRATE WITH A CONDUCTIVE BONDING MATERIAL

BACKGROUND OF THE INVENTION

1. Field of the Invention

The present invention relates to an acceleration sensor to detect an acceleration, and more particularly to an acceleration sensor used, for example, for an airbag in an automobile.

2. Description of the Related Art

An acceleration sensor using a piezoelectric body has conventionally been used for detecting the acceleration in an airbag in an automobile and the like. An example of this type of acceleration sensor is disclosed in Japanese Laid-Open Patent Publication No. 5-322915. FIGS. 14 and 15 are each a perspective view illustrating the conventional acceleration sensor.

An acceleration sensor 51 has a structure in which an acceleration detection element 53 is mounted on a hybrid IC substrate 52. The hybrid IC substrate 52 is fixed to an insulating base substrate 54. A metal case 55 in a shape which opens downward is mounted from above onto a multilayered body formed of the hybrid IC substrate 52 and the base substrate 54, and the acceleration detection element 53 is enclosed in the internal space.

Signal pickup electrodes 56 and 57, which are electrically connected to the acceleration detection element 53, are formed on the hybrid IC substrate 52. The acceleration detection element 53 includes first and second piezoelectric bodies 58 and 59. The first and second piezoelectric bodies 58 and 59 are both formed of a lead zirconate titanate type piezoelectric ceramic, and are polarized in the direction of the arrows A1 and A2. That is, both the first and second piezoelectric bodies 58 and 59 are polarized so that the polarization directions of the first and second piezoelectric bodies 58 and 59 become parallel to the main surface of the hybrid IC substrate 52, but oppose each other.

Electrodes (not shown) are formed on the top surface and the bottom surface of the piezoelectric bodies 58 and 59. The electrodes on the top surface of the piezoelectric bodies 58 and 59 are bonded to a weight 60, and are electrically connected to each other via the weight 60. The weight 60 performs the functions of electrically connecting the electrodes on the top surface of the piezoelectric bodies 58 and 59 and increasing the detection sensitivity by applying a weight from above to the piezoelectric bodies 58 and 59.

The electrodes (not shown) on the bottom surface of the piezoelectric bodies 58 and 59 are in direct contact with the signal pickup electrodes 56 and 57, respectively, and are electrically connected thereto.

The electrodes on the bottom surfaces of the piezoelectric bodies 58 and 59 and the signal pickup electrodes 56 and 57 are connected in the following way. The electrode on the bottom surface of the piezoelectric body 58 and the signal pickup electrode 56 are brought into direct contact with each other and bonded together by using a small amount of an insulating adhesive material so that the electrode on the bottom surface of the piezoelectric body 58 and the signal pickup electrode 56 are brought into direct contact with each other in a manner in which the adhesive layer does not have a substantial thickness. This structure can be obtained because the bottom surface of the piezoelectric body 58 and the electrode formed on the bottom surface of the piezoelectric body 58 are so rough that the protruding portion of the electrode on the bottom surface of the piezoelectric body 58 and the protruding portion of the signal pickup electrode 56 are brought into direct contact with each other while the remaining portion of the electrode on the bottom surface of the piezoelectric body 58 and the signal pickup electrode 56 are bonded together via the insulating adhesive material.

The reason why conduction is secured by performing bonding by using an insulating bonding agent and by bringing the electrode on the bottom surface of the piezoelectric body 58 and the signal pickup electrode 56 into direct contact with each other as described above is that the amount of insulating bonding agent used is reduced, thereby achieving a lower height of the acceleration sensor 51.

In the acceleration sensor 51, the acceleration which acts in the direction of the arrow A (see FIG. 15), that is, the acceleration which acts in a direction parallel to the main surface of the hybrid IC substrate 52, is detected. In this case, since the piezoelectric bodies 58 and 59 are fixed onto the hybrid IC substrate 52, as described above, even if a large acceleration is generated in a direction at right angles to the hybrid IC substrate 52, breakage of the acceleration detection element 53, peeling off thereof from the hybrid IC substrate 52, and others are not likely to occur.

In an acceleration sensor for an airbag and the like, there has been a demand for detection of the acting acceleration with greater accuracy. The conventional acceleration sensor 51 is capable of accurately detecting an acceleration acting in the shearing direction. However, there has been a further demand for improvements in reliability of conduction in an acceleration sensor for an airbag and the like.

Also, in the above-described acceleration sensor, it has been found by the inventors of the present invention that an excessive amount of stress is transmitted from the hybrid IC substrate to the acceleration detection element because of temperature changes, causing sporadic noise to be generated and that there is a risk that this may lead to a malfunction.

SUMMARY OF THE INVENTION

It is therefore an object of the present invention to provide an acceleration sensor which detects the acceleration acting in the shearing direction with an even greater increase in the reliability of conduction. Another object of the present invention is to provide an acceleration sensor which prevents the occurrence of noise due to temperature changes, thereby preventing a malfunction.

An acceleration sensor accomplishing the foregoing and other objects may comprise a circuit substrate and an acceleration detection element. The acceleration detection element is mounted on the circuit substrate and formed by using a piezoelectric body and is constructed so as to detect an acceleration which acts in a shearing direction. An electrode formed on the circuit substrate and an electrode on the bottom surface of the acceleration detection element are bonded together via a conductive bonding material so that they do not have direct contact with each other.

The mechanical construction of the acceleration detection element which can be used in the present invention is not particularly limited. According to a specific aspect of the present invention, the acceleration detection element includes first and second piezoelectric elements, each of the first and second piezoelectric elements including a piezoelectric body, a first electrode formed on the top surface of the piezoelectric body, and a second electrode formed on the bottom surface, the polarization directions of the piezoelectric bodies of the first and second piezoelectric elements being parallel to the top surface and the bottom surface of the piezoelectric body, and the polarization direction of the piezoelectric body of the first piezoelectric element and the polarization direction of the piezoelectric body of the second piezoelectric element being opposite to each other, and the first electrode of the first piezoelectric element and the first electrode of the second piezoelectric element are electrically connected to each other.

Further, according to a more specific aspect of the present invention, weights fixed onto the first and second piezoelectric elements are further provided.

Preferably, the conductive bonding material has a thickness of 40 to 1,000 μm and, more preferably, a thickness of 40 to 200 μm.

According to the present invention, it is possible to provide an acceleration sensor capable of enhancing the reliability of electrical connection between the acceleration detection element and the circuit substrate.

In particular, in the case where a material having a coefficient of elasticity lower than that of a piezoelectric ceramic and that of an insulating ceramic is used as the conductive bonding material, it is possible to relieve the stress generated by the difference in the thermal expansion coefficients between the acceleration detection element and the circuit substrate caused by temperature changes. Therefore, even if subjected to temperature changes, it is possible to provide an acceleration sensor whose bonding strength is not likely to decrease. Also, since the stress which is transmitted from the circuit substrate to the acceleration detection element, because of temperature changes, is absorbed and relieved by the conductive bonding material, sporadic noise is not likely to occur, thereby making it possible to prevent a malfunction.

In addition, it is possible to detect with high accuracy an acceleration acting in a shearing direction, that is, in a direction parallel to the top and bottom surfaces of the piezoelectric plate and along a direction in which the first and second piezoelectric plates are connected to each other.

Further, in the case where a weight is provided on the first and second piezoelectric elements in such a manner as to extend over the first and second piezoelectric elements, a mass is applied to the weight and the first and second piezoelectric elements, thereby making it possible to suppress reliably a distortion other than that in a shearing direction. Therefore, it is possible to detect an acceleration acting in a shearing direction with high accuracy.

Moreover, since the thickness of the conductive bonding material is 40 μm or more, it is possible to effectively relieve the distortion between the acceleration detection element and the circuit substrate by the conductive bonding material, thereby making it possible to provide an acceleration sensor having excellent detection sensitivity.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

Figure 1:
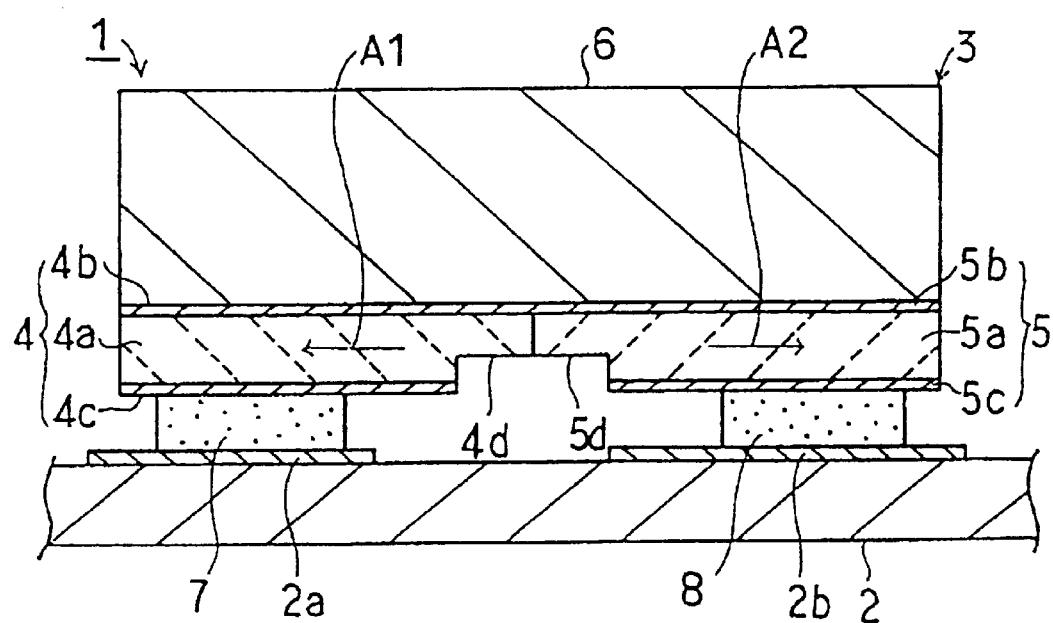
FIG. 1 is a sectional view illustrating an acceleration sensor according to a first embodiment of the present invention.

FIG. 1 is a sectional view of an acceleration sensor according to a first embodiment of the present invention.

As shown in FIG. 1, an acceleration sensor 1 has a construction in which an acceleration detection element 3 is mounted onto a hybrid IC substrate 2 serving as a circuit substrate.

Electrode lands 2a and 2b are formed on the top surface of the hybrid IC substrate 2. The electrode lands 2a and 2b are provided so that the acceleration detection element 3 is electrically connected to the signal processing circuit 2C (FIG. 3) of the hybrid IC substrate 2 and so that the acceleration detection element 3 is fixed.

The acceleration detection element 3 comprises first and second piezoelectric elements 4 and 5. The first piezoelectric element 4 has a construction in which an electrode 4b is formed on the top surface of a piezoelectric plate 4a and an electrode 4c is formed on the bottom surface thereof. In a similar manner, the second piezoelectric element 5 has a construction in which an electrode 5b is formed on the top surface of a piezoelectric plate 5a and an electrode 5c is formed on the bottom surface thereof. The piezoelectric plates 4a and 5a are polarized in the direction of the arrows A1 and A2 shown in the figure, respectively, that is, polarized in a direction parallel to the main surface of the piezoelectric plates 4a and 5a and in mutually opposite directions.

The piezoelectric plates 4a and 5a may be formed of an appropriate piezoelectric ceramic, such as a lead zirconate titanate type piezoelectric ceramic, or a piezoelectric single crystal.

Electrodes 4b, 4c, 5b, and 5c are formed of an appropriate conductive material, such as Ag or Ag—Pd.

The first and second piezoelectric elements 4 and 5 have cut-out or sunk sections 4d and 5d, in which the first and second piezoelectric elements 4 and 5 have a thinner thickness. These cut-out sections 4d and 5d are formed along one side of the rectangular piezoelectric plates 4a and 5a so that the bottom surface of the first and second piezoelectric elements 4 and 5 are sunk at the cut-out sections 4d and 5d, and the piezoelectric elements 4 and 5 are bonded together in such a way that the cut-outs 4d and 5d abut with each other so as to face each other.

The electrodes 4c and 5c on the bottom surface are not formed within the cut-outs 4d and 5d. The cut-outs 4d and 5d are provided so as to prevent a short-circuit between the electrodes 4c and 5c. The bonding between the piezoelectric plates 4a and 5a which form the first and second piezoelectric elements may be performed by using an appropriate insulating bonding agent. Alternatively, the piezoelectric plates 4a and 5a may be formed monolithically in such a manner as to be formed into the desired shape.

Also, the electrodes 4b and 5b are electrically connected to each other, and are constructed monolithically by forming a metallic film on the entire surface of the top surface of the piezoelectric plates 4a and 5a after the piezoelectric plates 4a and 5a are bonded together. However, the electrodes 4b and 5b may be respectively formed on the top surface of the piezoelectric plates 4a and 5a in advance.

A weight 6 is fixed above the first and second piezoelectric elements 4 and 5. That is, the weight 6 is bonded in such a manner as to extend over the first and second piezoelectric elements 4 and 5 on the top surface thereof.

The weight 6 may be formed of an appropriate metal, such as Cu or Al, or an appropriate alloy, or an insulating ceramic, such as alumina, or an insulating material of a synthetic resin. The weight 6 may further have a construction in which a conductive film is formed on the surface of an insulating material. In this embodiment, since the electrodes 4b and 5b are monolithically formed as shown in FIG. 1, the weight 6 does not need to have a conductive surface. When the electrodes 4b and 5b are separated, however, the bottom surface of the weight 6 should preferably be formed so as to have a conductive surface, thereby making an electrical connection between the electrodes 4b and 5b.

The weight 6 has the function of enhancing the detection sensitivity by applying a mass to the piezoelectric elements 4 and 5.

The acceleration detection element 3 is bonded to the electrodes 2a and 2b of the hybrid IC substrate 2 via conductive bonding materials 7 and 8. In this embodiment, the conductive bonding materials 7 and 8 are formed by applying and hardening a conductive paste, such as a conductive powder of Ag, Ag—Pd, or the like which is mixed into an epoxy resin or the like. However, as long as the electrodes 4c and 5c and the electrode lands 2a and 2b can be electrically connected to each other, the conductive bonding materials 7 and 8 may be formed by an appropriate member, such as another conductive material, or a member such that a conductive film is formed on an insulating material.

Figure 2:
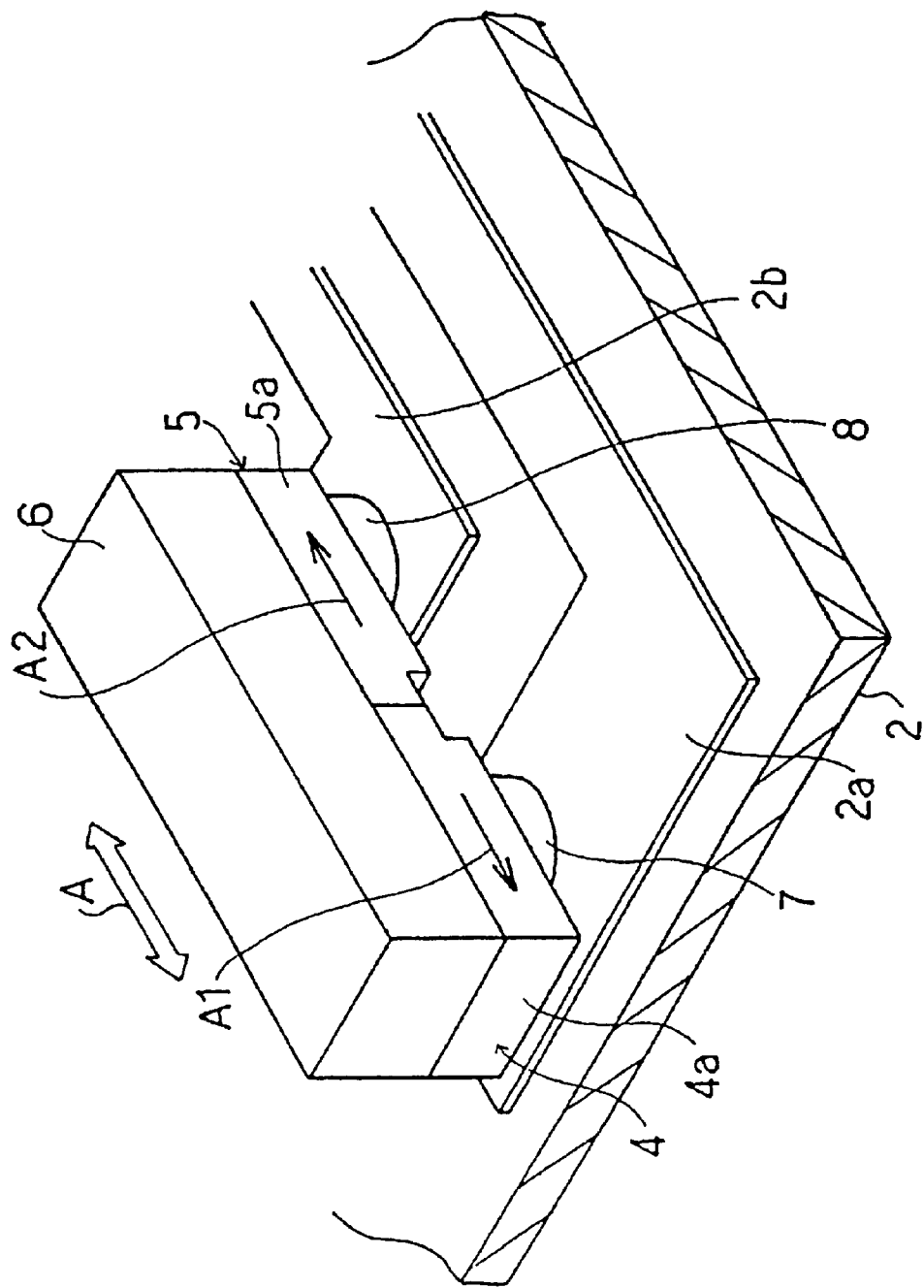
FIG. 2 is a schematic perspective view illustrating the operation of the acceleration sensor shown in FIG. 1.

In the acceleration detection sensor 1, since the piezoelectric plates 4a and 5a are polarized as described above, an electrical signal corresponding to the distortion of the piezoelectric plates 4a and 5a based on the acceleration acting in a shearing direction, that is, in the direction indicated by the arrow A in FIG. 2, is picked up from the electrode lands 2a and 2b. In this case, since a load is applied to the piezoelectric elements 4 and 5 by the weight 6, a distortion in a direction other than the shearing direction is effectively suppressed and, therefore, the acceleration acting along the arrow A can be detected with high accuracy. In FIG. 2, an illustration of the electrodes 4b, 4c, 5b, and 5c is omitted.

The acceleration detection element 3 is bonded to the electrodes 2a and 2b of the hybrid IC substrate 2 by the conductive bonding materials 7 and 8. That is, since the electrodes 4c and 5c and the electrode lands 2a and 2b are bonded to each other via the conductive bonding materials 7 and 8, the conduction between the acceleration detection element 3 and the hybrid IC substrate 2 can be maintained reliably.

That is, in the conventional acceleration sensor 51 (FIGS. 14 and 15), the electrodes of the acceleration detection element are brought into direct contact with the electrodes 56 and 57 on the hybrid IC substrate 52 by using a small amount of insulating bonding agent, thereby making conduction. For this reason, the conduction between the acceleration detection element 53 and the hybrid IC substrate 52 is not necessarily achieved sufficiently, presenting the problem that the reliability of conduction is low.

In comparison, in the acceleration sensor 1 of this embodiment, since the electrodes 4c and 5c and the electrode lands 2a and 2b are bonded to each other in such a way that they do not have direct contact with each other and are bonded via the conductive bonding materials 7 and 8, the stress between the acceleration detection element 3 and the hybrid IC substrate 2 is reduced, thereby enhancing the reliability of conduction.

Also, the presence of these conductive bonding materials 7 and 8 causes the stress applied from the hybrid IC substrate 2 to the acceleration detection element 3, because of temperature changes, to be absorbed and relieved, and sporadic noise is not generated, making it possible to prevent a malfunction. It is thought that this is attributed to the elasticity that the conductive bonding materials 7 and 8 possess.

Furthermore, in the acceleration sensor 1, since the acceleration detection element 3 is bonded to the hybrid IC substrate 2 via the conductive bonding materials 7 and 8, the reliability of the bonding strength of the acceleration detection element 3 to the hybrid IC substrate 2 is enhanced. This will be described with reference to FIGS. 4 and 5.

Table 1 described below shows the thermal expansion coefficient and the coefficient of elasticity of a lead zirconate titanate type piezoelectric ceramic, an alumina substrate, a conductive-paste solidified substance (the composition is 55 wt. % of Ag, and 45 wt. % of an epoxy resin), and carbon.

TABLE 1

|  | Thermal expansion coefficient ($\times 10e^{-6}/°$ C.) | Coefficient of elasticity (kgf/mm$^2$) |
| --- | --- | --- |
| Lead zirconate titanate type piezoelectric ceramic | 2 | 6000 |
| Alumina | 5 | 32000 |
| Conductive-paste solidified substance | 90 | 100 |
| Carbon | 2 | 2500 |

Figure 4:
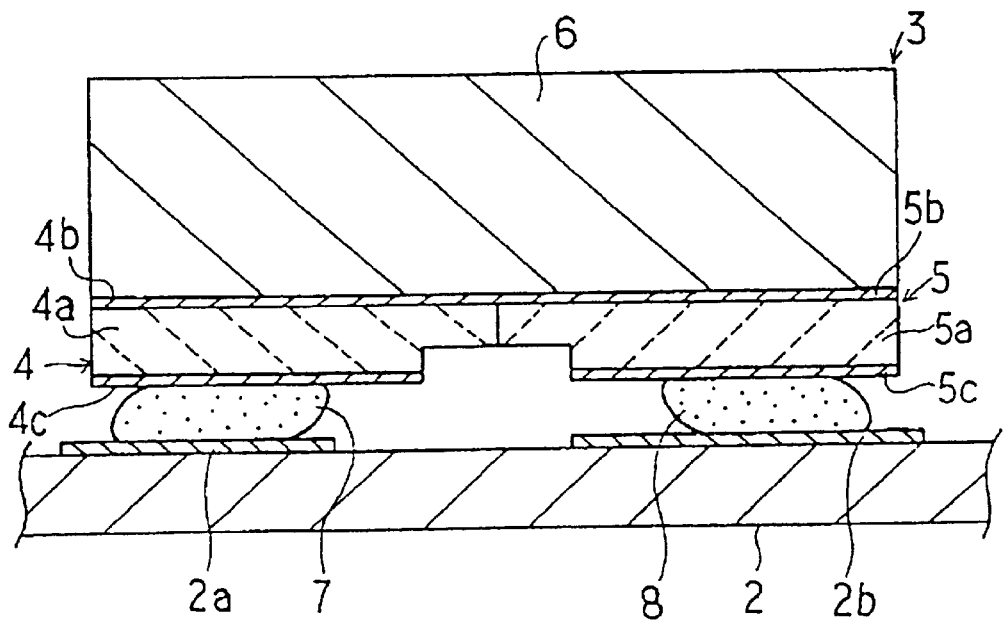
FIG. 4 is a sectional view illustrating a deformed state of a conductive bonding material when temperature changes occur.

If the acceleration sensor 1 is subjected to temperature changes, at high temperatures, the piezoelectric elements 4 and 5, the solidified conductive pastes 7 and 8, and the hybrid IC substrate 2 thermally expand, and at low temperatures, they thermally contract. As is clear from Table 1, however, since the coefficient of elasticity of the conductive bonding materials 7 and 8 made of a conductive paste is far smaller than those of the lead zirconate titanate type piezoelectric ceramic and alumina, the stress based on the difference between thermal expansion and thermal contraction is absorbed by the deformation of the conductive bonding materials themselves, as shown in FIGS. 4 and 5.

Figure 5:
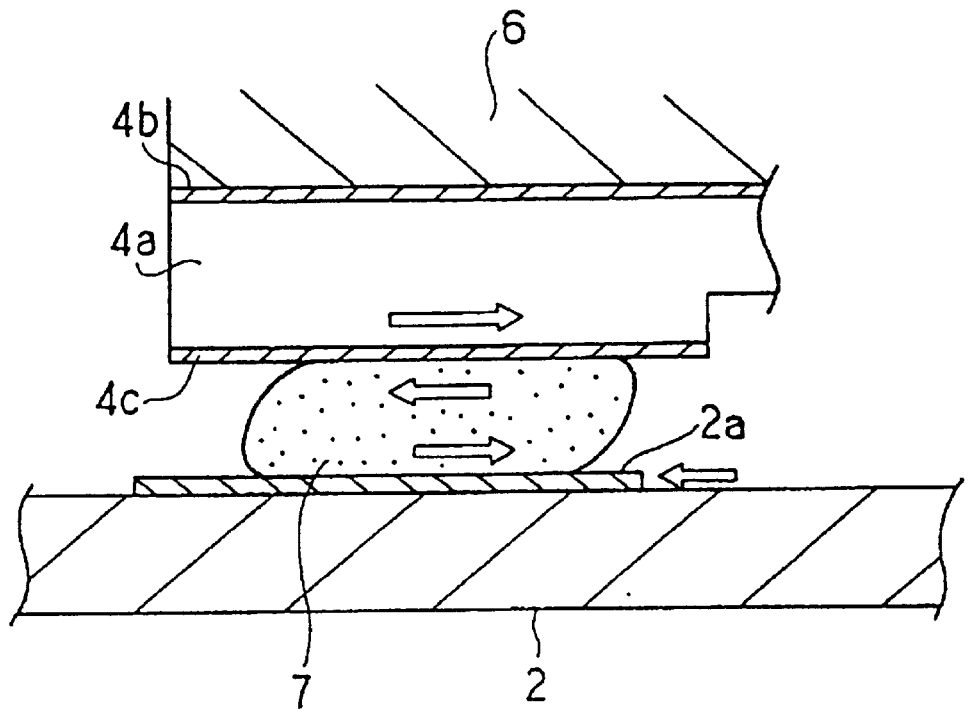
FIG. 5 is a partial, sectional view showing the enlarged essential portion of FIG. 4.

That is, near each interface of the piezoelectric plate 4a, the conductive bonding material 7, and the electrode 2a, a stress is generated, as indicated by the arrows in FIG. 5. However, this stress is absorbed by the deformation of the conductive bonding material 7. Therefore, stress acting in a shearing direction in the interface between the piezoelectric elements 4 and 5 and the conductive bonding materials 7 and 8 and in the interface between the conductive bonding materials 7 and 8 and the hybrid IC substrate 2 becomes very small, and the peeling off of the acceleration detection element 3 from the hybrid IC substrate 2 can be prevented effectively.

Figure 3:
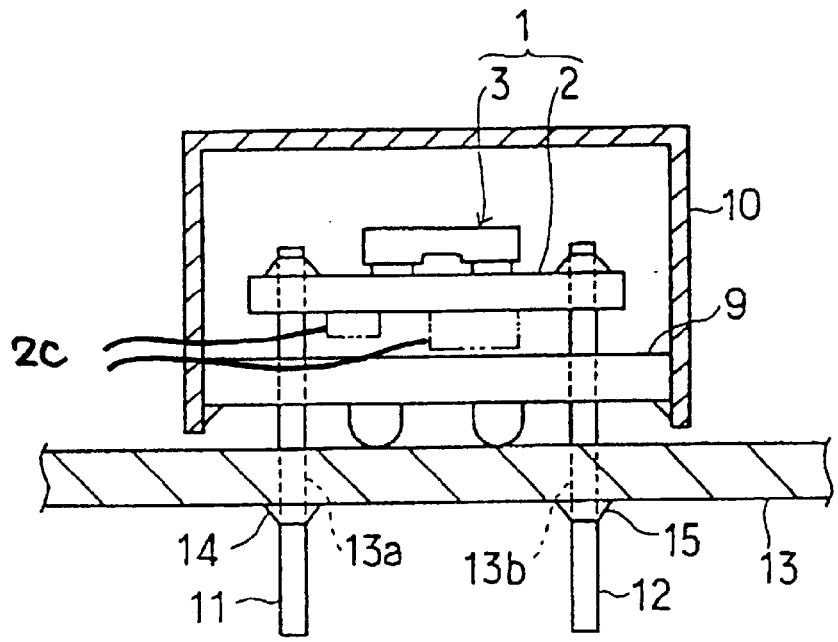
FIG. 3 is a sectional view illustrating a state in which the acceleration sensor of the embodiment shown in FIG. 1 is housed within a package and mounted to a printed-circuit board.

The acceleration sensor 1 of this embodiment is a product having an appropriate package structure; in an example, the package structure shown in FIG. 3 is used. In the acceleration sensor 1 shown in FIG. 3, the acceleration detection element 3 is mounted on the hybrid IC substrate 2 as described above, and the hybrid IC substrate 2 is mounted to the base substrate 9 which forms the package, with a metal case 10 having an opening in the downward direction being fixed to the base substrate 9.

Reference numerals 11 and 12 each denotes a metal terminal, each of which is electrically connected to the hybrid IC substrate 2 and goes through the base substrate 9. Further, the metal terminals 11 and 12 are inserted into mounting holes 13a and 13b of a printed-circuit board 13, and the metal terminals 11 and 12 are fixed to the printed-circuit board 13 by using solders 14 and 15.

Next, the capability of the detection sensitivity and the bonding strength being increased by the acceleration sensor 1 of this embodiment will be described with reference to a specific experiment example.

Figure 6:
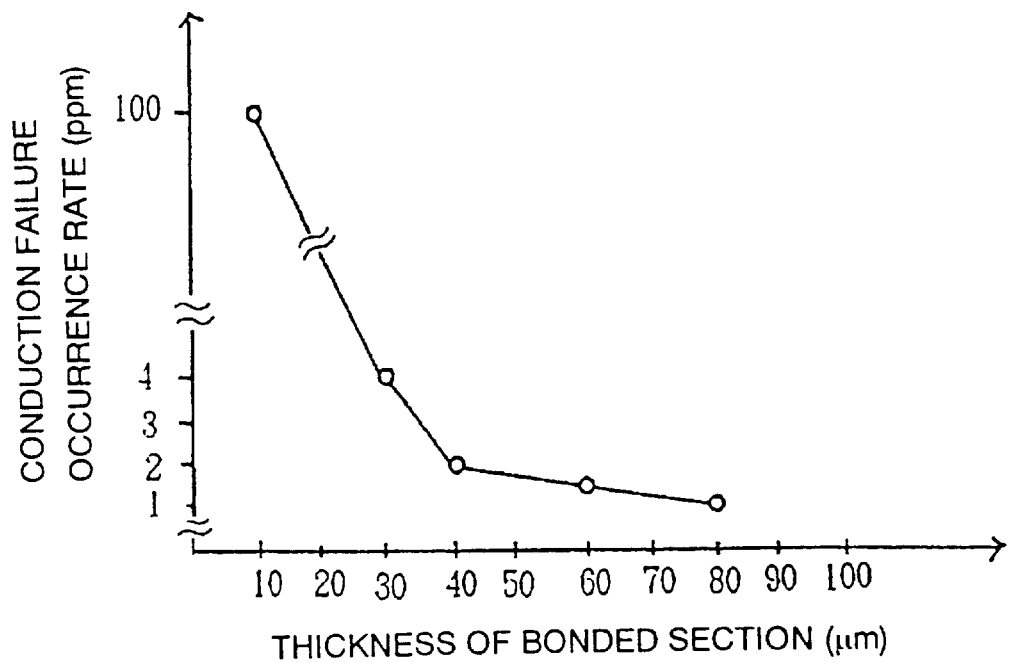
FIG. 6 is a graph showing the relationship between the thickness of the conductive bonding material and the conduction failure occurrence rate.

FIG. 6 is a graph illustrating changes in reliability of conduction of the acceleration sensor 1 with variation in the thicknesses of the conductive bonding materials 7 and 8. The solid line indicates the results for this embodiment in which the conductive bonding materials 7 and 8 made of a conductive paste having a composition of 55 wt. % of Ag, and 45 wt. % of an epoxy resin were used.

When the acceleration sensor 1 was constructed, the hybrid IC substrate 2 was made of an alumina substrate having a thickness of 0.8 mm, and as the piezoelectric plates 4a and 5a, piezoelectric plates formed of a lead zirconate titanate type piezoelectric ceramic and having dimensions of 3×2.4×0.15 mm were used.

As is clear from FIG. 6, by increasing the thicknesses of the thick conductive bonding materials 7 and 8 of the conductive bonding material, it is possible to effectively reduce the stress and to increase the reliability of conduction. Further, the results of FIG. 6 show that by setting the thicknesses of the conductive bonding materials 7 and 8 to be equal to or greater than 40 μm, the reliability of conduction can be improved even more. The thicknesses of the conductive bonding materials 7 and 8 are not limited to a specific value as long as the thicknesses are equal to or greater than 40 μm. However, the thicknesses are preferably equal to or less than 1000 μm in view of the production cost and productivity, and it is more preferable that the thicknesses are in the range from 40 to 200 μm.

Figure 7:
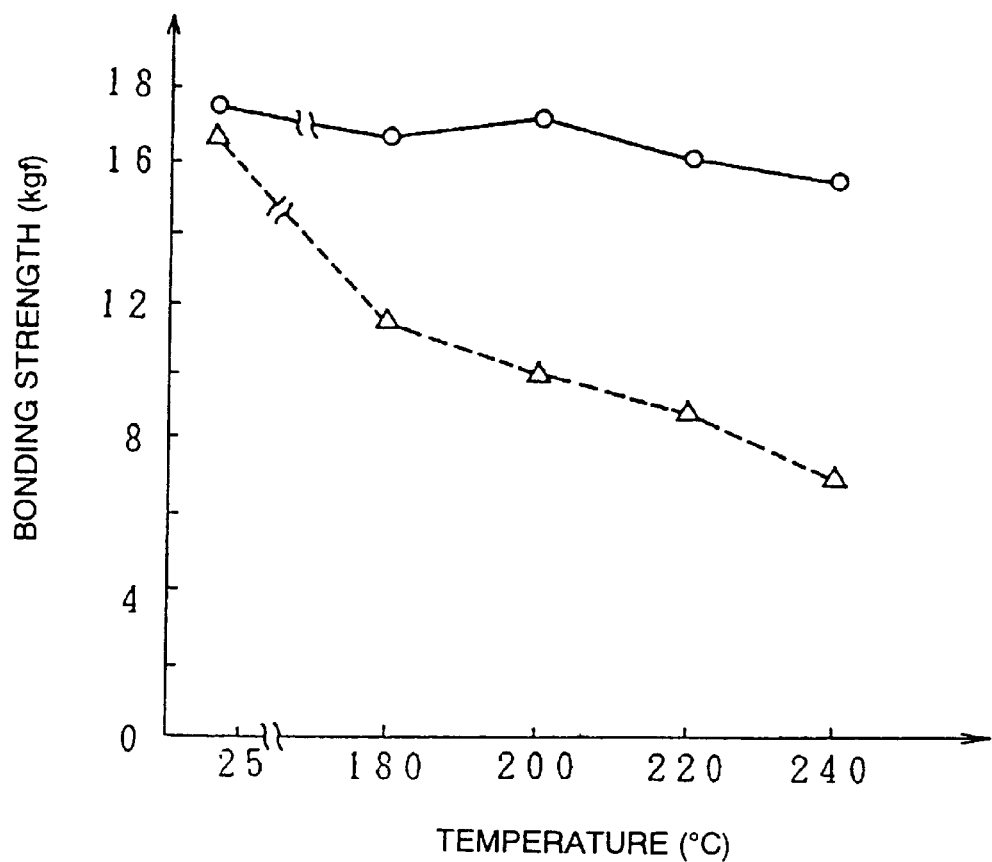
FIG. 7 is a graph showing changes of the bonding strength between the acceleration detection element and the substrate when the acceleration sensor is heated.
Figure 14:
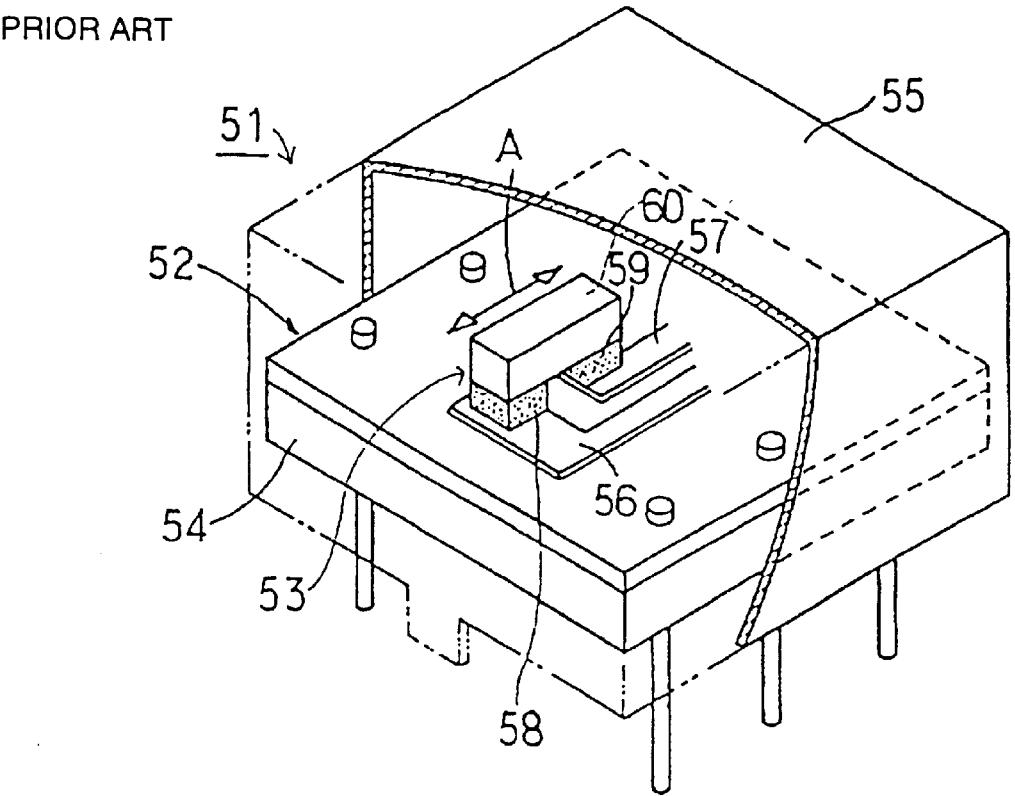
FIG. 14 is a perspective view illustrating a conventional acceleration sensor.
Figure 15:
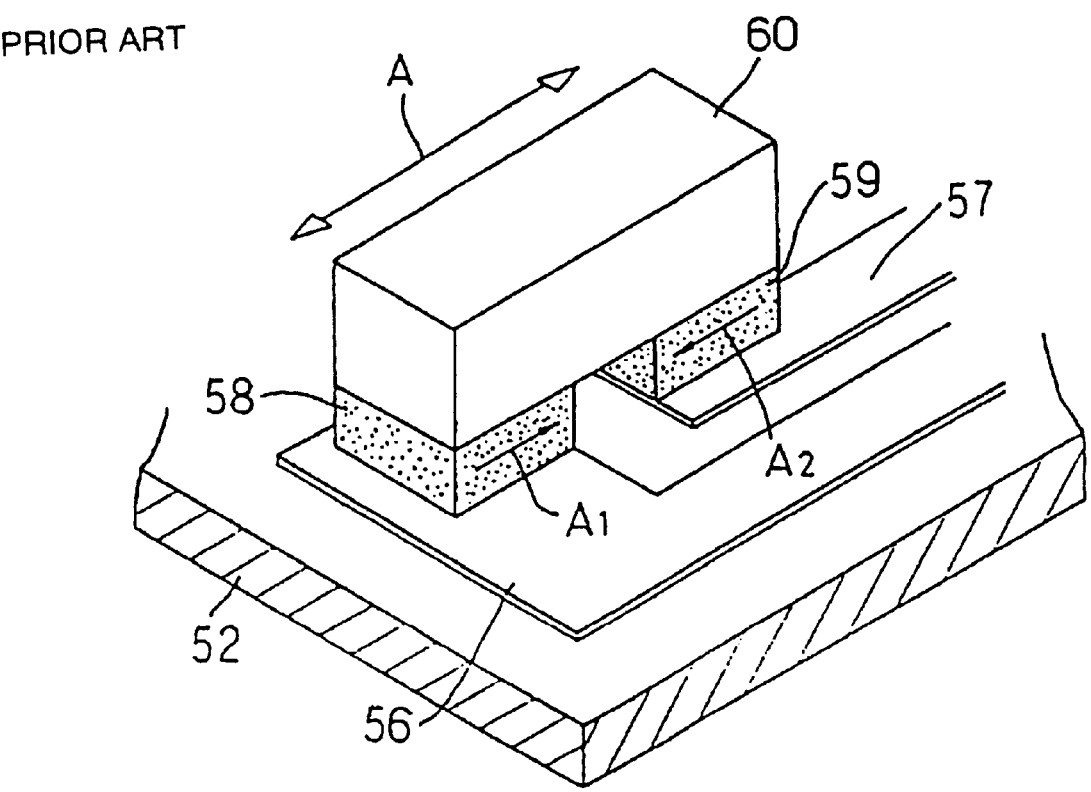
FIG. 15 is a partial, cutaway sectional view showing the conventional acceleration sensor.

FIG. 7 is a graph showing changes in the bonding strength caused by the thermal expansion difference between the hybrid IC substrate and the acceleration detection element in cases where the acceleration sensor of this embodiment and the conventional acceleration sensor 51 shown in FIGS. 14 and 15 were heated. A force is applied to the acceleration detection element fixed to the hybrid IC substrate in a direction perpendicular to the direction in which the acceleration is detected within the hybrid IC substrate plane, and the tensile strength in a state in which the connection is released is represented as a bonding strength. In FIG. 7, the solid line indicates the results of this embodiment, and the broken line indicates the results of the conventional acceleration sensor.

As is clear from FIG. 7, when heating from room temperature to 240° C., in the conventional acceleration sensor 51, the bonding strength of the acceleration detection element to the hybrid IC substrate decreases with an increase in the heating temperature, whereas in the acceleration sensor of this embodiment, the bonding strength is hardly decreased. Therefore, the results of FIG. 7 show that an acceleration sensor having thermal shock resistance can be constructed by providing the conductive bonding materials 7 and 8, which use a conductive paste, between the acceleration detection element and the hybrid IC substrate 2.

Modification of the First Embodiment

Figure 8:
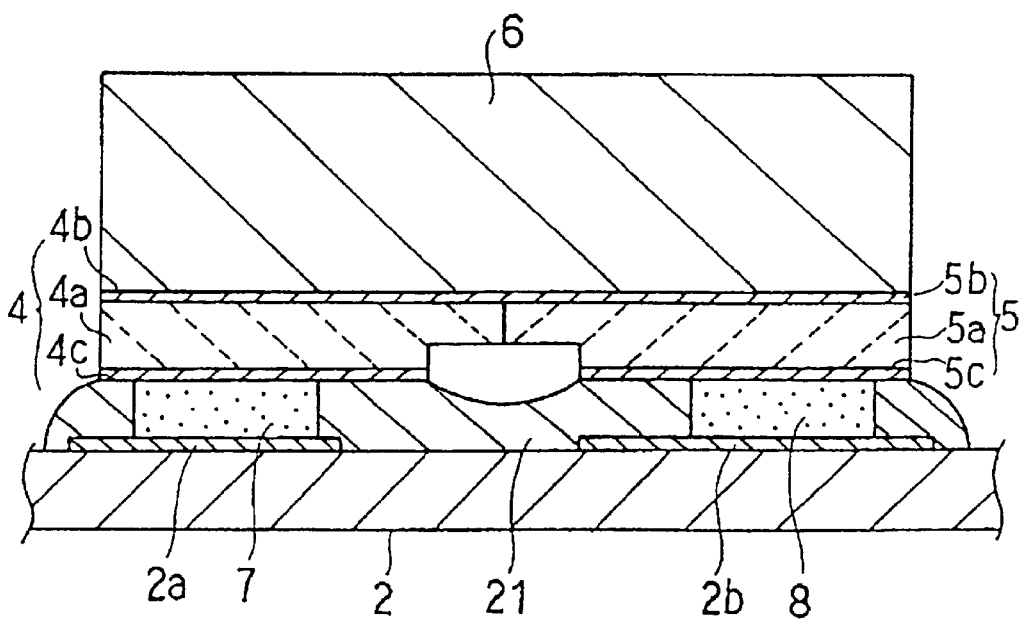
FIG. 8 is a sectional view illustrating an acceleration sensor according to a second embodiment of the present invention.

FIG. 8 is a sectional view illustrating a modification of the first embodiment of the acceleration sensor of the present invention.

In the acceleration sensor 1 of the first embodiment, the first and second piezoelectric elements 4 and 5 are connected to the hybrid IC substrate 2 by the conductive bonding materials 7 and 8; however, in this case, as shown in FIG. 8, an insulating bonding agent 21 may be applied around the conductive bonding materials 7 and 8. By applying the insulating bonding agent 21 in this way, the bonding strength of the acceleration detection element 3 to the hybrid IC substrate 2 can be increased even more. Examples of an insulating bonding agent 21 include an epoxy bonding agent, a silicon bonding agent, and an acryl bonding agent.

Another Modification

Figure 9:
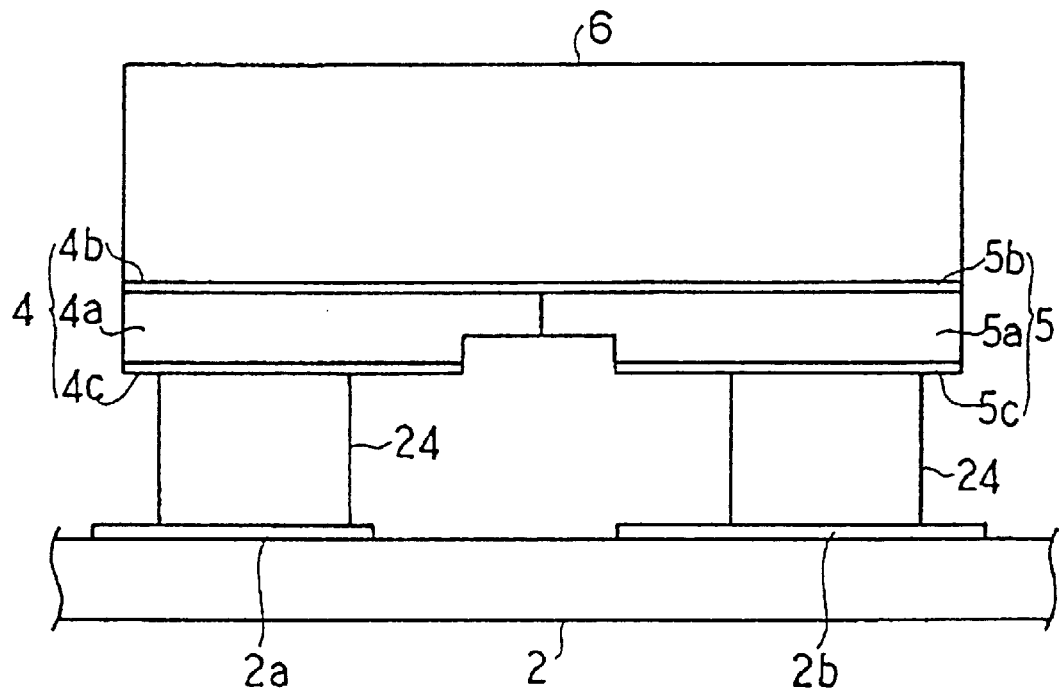
FIG. 9 is a sectional view illustrating another example of the acceleration sensor of the present invention.
Figure 10:
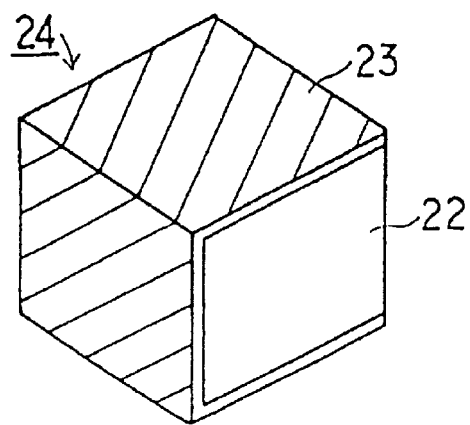
FIG. 10 is a perspective view showing a conductive bonding material used in the embodiment shown in FIG. 9.

In the first embodiment, the conductive bonding materials 7 and 8 are formed of a conductive-paste solidified substance. However, as shown in FIGS. 9 and 10, a conductive bonding material 24 having a conductive film 23 formed on the external surface of a rectangular parallelepiped spacer 22 made of an insulating ceramic may be used. In this case, the conductive film 23 is formed in such a manner as to extend over the top surface, the side surfaces, and the bottom surface of the spacer 22. Therefore, the electrodes 4b and 5b and the electrode lands 2a and 2b are electrically connected to each other reliably by the conductive film 23.

Figure 11:
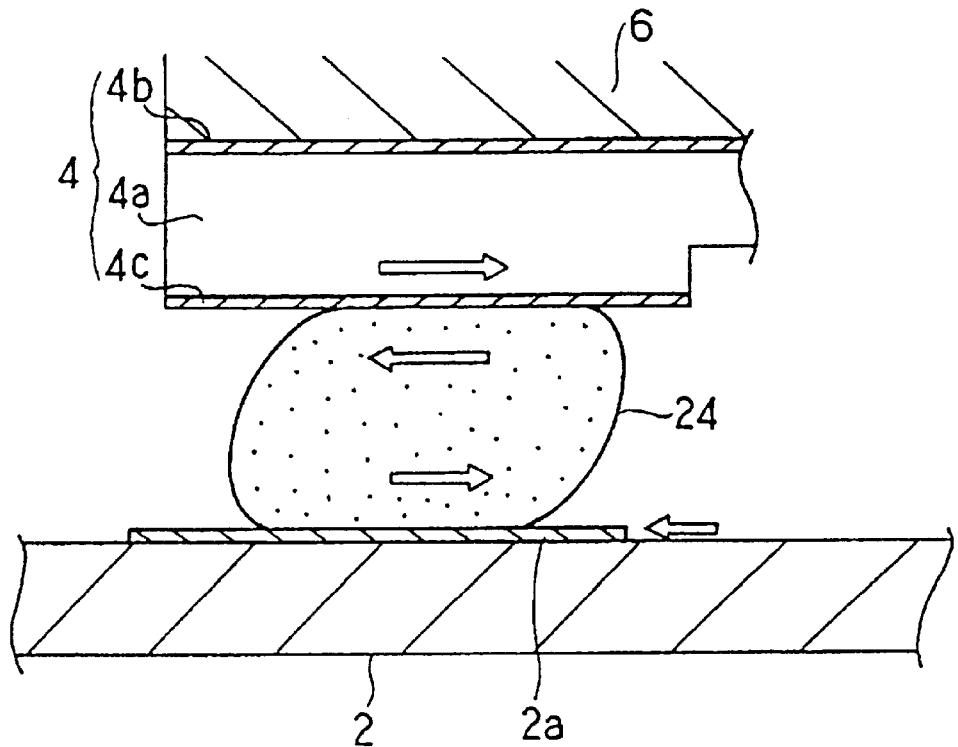
FIG. 11 is a sectional view illustrating a deformed state of the conductive bonding material when the acceleration sensor shown in FIG. 9 is heated.

Also in this case, if subjected to temperature changes, the piezoelectric elements 4 and 5, the conductive bonding material 24, and the hybrid IC substrate 2 thermally expand, and a stress is generated in the interface between each pair of members, as shown in FIG. 11. However, the stress generated in each of the interfaces between the piezoelectric plate 4a and the hybrid IC substrate 2 is relieved by the conductive bonding material 24.

Figure 12:
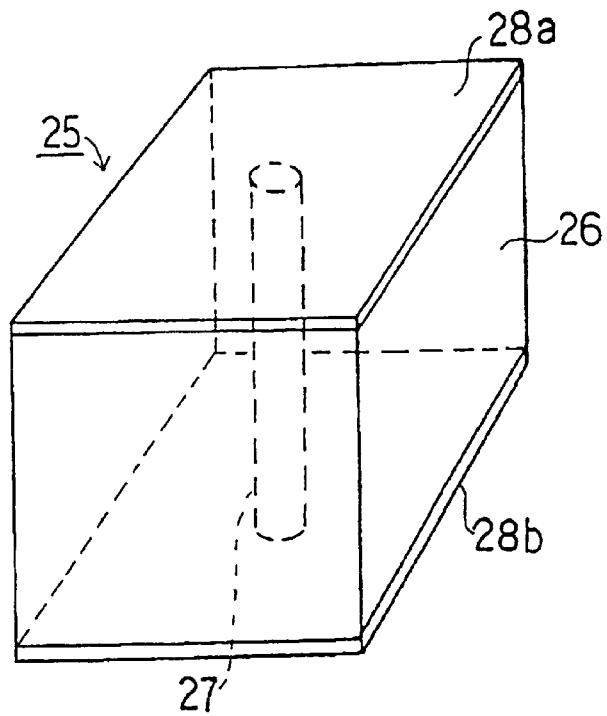
FIG. 12 is a perspective view showing another example of the conductive bonding material.
Figure 13:
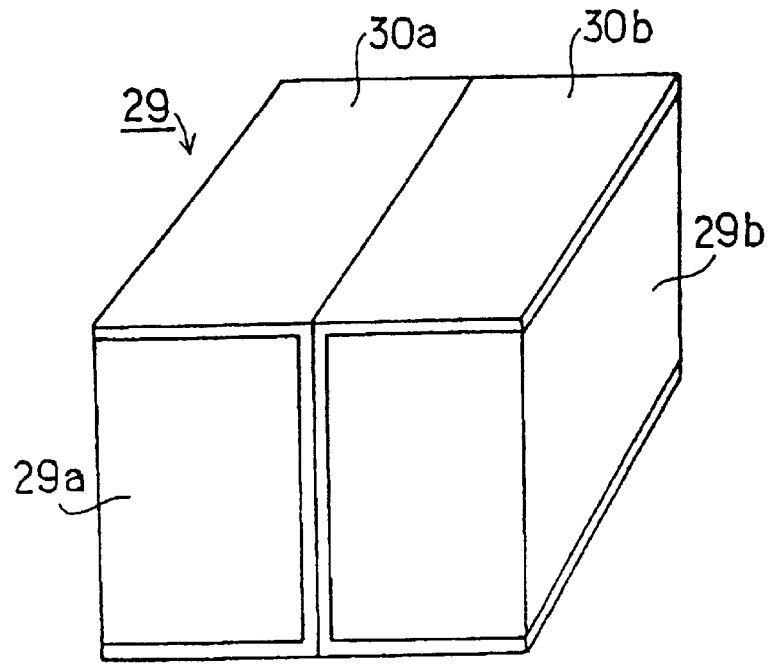
FIG. 13 is a perspective view showing still another example of the conductive bonding material.

The conductive bonding material may be a deformed material as shown in FIGS. 12 and 13.

In a conductive bonding material 25 shown in FIG. 12, a through-hole electrode or via hole electrode 27 is formed so as to extend from the top surface of a spacer 26 to the bottom surface thereof, with conductive films 28a and 28b being formed on the top and bottom surfaces, respectively, of the spacer 26. Therefore, the through-hole electrode or via hole electrode 27 causes the electrodes on the top and bottom surfaces to be electrically connected to each other.

Further, in a conductive bonding material 29 shown in FIG. 13, spacer half-bodies 29a and 29b made of an insulating ceramic are bonded together, though conductive films 30a and 30b are formed on the top surface, one side surface, and the bottom surface of the spacer half-bodies 29a and 29b, respectively. Further, the spacer half-bodies 29a and 29b are bonded together in the conductive film portion formed on their respective side surfaces. Therefore, by using the conductive bonding material 29 instead of the conductive bonding materials 7 and 8, it is also possible to increase the reliability of electrical connection between the upper electrode 4a and the electrode 2a on the hybrid IC substrate 2.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An acceleration sensor, comprising: a circuit substrate; and an acceleration detection element mounted on said circuit substrate and including a piezoelectric body, said acceleration detection element being constructed so as to detect an acceleration which acts in a shearing direction, wherein an electrode formed on said circuit substrate and an electrode on the bottom surface of said acceleration detection element are bonded together via a conductive bonding material so that said electrodes do not have direct contact with each other, said conductive bonding material having a thickness in a range of 40 to 1,000 µm.

2. An acceleration sensor, comprising:

a circuit substrate; and an acceleration detection element, said acceleration detection element including first and second piezoelectric elements, each of the first and second piezoelectric elements including a piezoelectric body, a first electrode formed on the top surface of the piezoelectric body, a second electrode formed on the bottom surface and a polarization direction, the polarization directions of the piezoelectric bodies of the first and second piezoelectric elements being parallel to the top surface and the bottom surface of the piezoelectric body, and the polarization direction of the piezoelectric body of the first piezoelectric element and the polarization direction of the piezoelectric body of the second piezoelectric element being opposite to each other, the first electrode of the first piezoelectric element and the first electrode of the second piezoelectric element being electrically connected to each other, and the second electrodes of the first and second piezoelectric elements being bonded to respective electrodes on said circuit substrate by conductive bonding material such that there is no contact between said second electrodes and said electrodes on said circuit substrate, said conductive bonding material having a thickness in a range of 40 to 1,000 µm.

3. An acceleration sensor according to claim 2, further comprising: weights fixed onto the first and second piezoelectric elements.

4. An acceleration sensor according to claim 2, further including insulating bonding material between said first and second piezoelectric elements and said circuit substrate.

5. An acceleration sensor according to claim 2, wherein said conductive bonding material comprises first and second non-conductive elements having a conductive film.

6. An acceleration sensor according to claim 5, wherein the first and second non-conductive elements each have at least one hole extending from a surface thereof in contact with one of said second electrodes to a surface in contact with one of said electrodes on said circuit substrate and conductive material in said hole to electrically connect such second electrode and such electrode on said circuit substrate.

7. An acceleration sensor according to claim 2, wherein the bottom surfaces of said first and second piezoelectric elements have adjacent cut-out portions and said second electrodes are not on said adjacent cut-out portions.

8. An acceleration sensor according to claim 1 or 2, wherein said conductive bonding material is made of a conducive paste.

9. An acceleration sensor, comprising:

a circuit substrate having a pair of electrodes thereon;

an acceleration detection element, including first and second piezoelectric elements, each of the first and second piezoelectric elements including a piezoelectric body, a second electrode formed on the bottom surface and a polarization direction, the polarization directions of the piezoelectric bodies of the first and second piezoelectric elements being parallel to the top surface and the bottom surface of the piezoelectric body, and the polarization direction of the piezoelectric body of the first piezoelectric element and the polarization direction of the piezoelectric body of the second piezoelectric element being opposite to each other, a first electrode of the first piezoelectric element and a first electrode of the second piezoelectric element being electrically connected to each other, a conductive paste bonding the second electrodes of the first and second piezoelectric elements to the pair of electrodes on the circuit substrate such that the second electrodes and the pair of electrodes do not have direct contact with each other; and an insulating bonding material being provided at a periphery of the conductive paste, wherein each of the first and second piezoelectric elements has cut-out portions provided so as to prevent a short-circuit between the second electrodes of the first and second piezoelectric elements.

10. An acceleration sensor according to claim 9, further comprising weights fixed onto the first and second piezoelectric elements.

11. An acceleration sensor according to claim 9, wherein said cut-out portions are disposed adjacent each other so as to face each other at the bottom surfaces of said first and second piezoelectric elements and said second electrodes are not on said adjacent cut-out portions.

* * * * *